United States Patent [19]

Knödel

[11] 4,378,710
[45] Apr. 5, 1983

[54] VARIABLE-SPEED TRANSMISSION FOR MOTOR CARS

[75] Inventor: Gunter Knödel, Mühlacker, Fed. Rep. of Germany

[73] Assignee: Getrag Getriebe-und Zahnradfabrik GmbH, Ludwigsburg, Fed. Rep. of Germany

[21] Appl. No.: 182,228

[22] Filed: Aug. 28, 1980

[30] Foreign Application Priority Data

Sep. 6, 1979 [DE] Fed. Rep. of Germany ....... 2936009

[51] Int. Cl.[3] .......................... F16H 3/38; F16D 23/06
[52] U.S. Cl. .................................... 74/339; 192/4 C; 192/53 F; 192/53 G; 192/114 R
[58] Field of Search .............. 192/53 F, 103 R, 53 G, 192/114 R, 4 C; 74/476, 339, 336

[56] References Cited

U.S. PATENT DOCUMENTS

| 3,202,005 | 8/1965 | Ivanchich . | |
|---|---|---|---|
| 3,620,338 | 11/1971 | Tomita et al. | 192/53 G |
| 4,192,196 | 3/1980 | Bogena et al. | 74/339 |
| 4,225,024 | 9/1980 | Kuzma | 74/339 X |
| 4,275,614 | 6/1981 | Okubo et al. | 74/476 |

FOREIGN PATENT DOCUMENTS

| 322375 | 5/1975 | Austria . |
| 624835 | 1/1936 | Fed. Rep. of Germany . |
| 1177948 | 9/1964 | Fed. Rep. of Germany . |
| 2247222 | 3/1974 | Fed. Rep. of Germany . |
| 2336250 | 2/1975 | Fed. Rep. of Germany . |
| 2506524 | 2/1977 | Fed. Rep. of Germany . |
| 890772 | 2/1944 | France . |
| 1314383 | 4/1973 | United Kingdom . |
| 1426718 | 3/1976 | United Kingdom . |

OTHER PUBLICATIONS

"Lastauto-Omnibus" Stuttgart May 1967 pp. 58, 60.

*Primary Examiner*—George H. Krizmanich
*Attorney, Agent, or Firm*—Murray Schaffer

[57] ABSTRACT

The invention relates to a variable-speed transmission for motor cars, in particular a manual gear-box in the form of a synchronized lay-shaft transmission having several forward speeds and one reverse motion, in which the gears of the reverse motion (11, 12) are also constantly meshing and in which the pairs of gears are selectively shifted into the flux of forces by means of a shifting clutch (13). In order to permit low-noise shifting into the reverse motion, the latter (11, 12) is provided with a synchronizer unit (17, 23). Considering, however, that this creates the risk that the reverse gear may be put in while the car is moving forward, a stop (9, 23) can be moved into the path of transmission of motion between a shift lever to be actuated by the driver and the shifting clutch (13) for the reverse motion, which stop occupies the engaged position when a predetermined traveling speed is exceeded and acts in this engaged position to block the actuation of the shifting clutch (13) for the reverse motion (11, 12) (FIG. 1). The stop is incorporated into the shifting clutch for the reverse gear.

7 Claims, 3 Drawing Figures

VARIABLE-SPEED TRANSMISSION FOR MOTOR CARS

TECHNICAL FIELD

The present invention relates to a variale-speed transmission for motor cars, in particular a manual gear-box in the form of a synchronized lay-shaft transmission having several forward speeds and one reverse motion, in which the gears of the reverse motion are also constantly meshing and in which the pairs of gears are selectively shifted into the flux of forces by means of a shifting clutch, the reverse motion, too, being provided with synchronizing means and a stop movable into the path of transmission of motion between a shift lever to be actuated by the driver and the shifting clutch for the reverse motion, which stop occupies the engaged position when a predetermined travelling speed is exceeded and acts in this engaged position to block the actuation of the shifting clutch for the reverse motion.

BACKGROUND ART

Manual gear boxes, contrary to automatic transmissions, are preferably designed as synchronized layshaft transmissions which have, in the direct speed, connected the drive shaft directly with the aligned driven shaft, while in the other speeds the flux of force is guided from the drive shaft to the driven shaft via a layshaft. The pairs of gears of the different speeds are constantly meshing and for this reason the gears arranged on the driven shaft are seated to rotate about the latter. For the purpose of putting in a speed, the corresponding gear and the driven shaft are positively coupled in the conventional manner. To facilitate the shifting process for the driver, the positive clutches are provided with preliminary friction clutches which serve as synchronizing mechanisms and ensure the synchronized motion of the shaft and the gear before they are positively coupled. Transmissions of this type have replaced in passenger cars the unsynchronized transmissions heretofore used. Initially, only the higher speeds were provided with synchronizing means, but later the first speed was also synchronized as it was found that it does not so seldom occur that the first speed is engaged while the car is moving. The reverse motion is usually not provided with synchronizing means, which means that its shifting clutch lacks the preliminary friction clutch. The reason for this is to be seen in the fact that due to the reversal of the travelling direction the car is always stopped before the reverse motion is put in. When shifting into the reverse motion, the drive shaft is indeed stationary—provided the motor car is not moving—but the gear for the reverse motion which is rotatably seated on the drive shaft is still moving as it is meshing with the gear seated on the layshaft (via an intermediate gear for the reversal of the sense of rotation) so that it revolves at a speed proportional to that of the drive motor. Although the driving connection between the drive motor and the layshaft is interrupted when the main clutch has been actuated, the individual parts continue to rotate as a result of the mass moment of inertia and come to a standstill only gradually as a result of the frictional losses, which in the case of heated-up transmissions may take many seconds as in this condition the oil is very thin.

Now, when the shifting clutch in the transmission is operated shortly after the driver has actuated the main clutch, the flanks of the teeth of the shifting clutch come abruptly to bear against each other so that the still revolving parts are suddenly stopped. Although this does not actually impair the service life of the transmission, the resulting noise is rather disturbing.

Of course, this drawback could be eliminated in the same manner which is also employed for the other gears, namely, by synchronizing means in the form of a preliminary friction clutch. But this would entail the risk that the reverse motion could be put in erroneously and unintentionally, and contrary to the consequences of such an error in the case of the other gears, the subsequent engagement of the main clutch would lead to damages or destructions in the driving system of the car if the latter were moving at a not inconsiderable forward speed.

It is already known to provide all gears of agricultural tractors with synchronizing means. But these tractors when being driven on the soil do not move for a longer period when the clutch is shifted. Therefore, no risk exists that at the subsequent engagement of the main clutch the tractor is moving at considerable speed. Furthermore, the main clutch is not arranged between engine and transmission, but is arranged between transmission and the driven axle. (Lastauto-Omnibus, May 1967.)

Finally, industrial vehicles are known for the transportation of heavy loads within buildings which are provided with transmissions with several forward and reverse gears, all of which are synchronized. In order to avoid damages in the driving system by rapid changing from forward to reverse gears, the transmission is provided with a mechanically or electrically actuated stop, the actuation of which depends on the vehicle speed. The stop is arranged to block up the operation of the manually operable gear lever (German Auslegeschrift 11 77 948).

Now, it is the object of the present invention to provide a variable speed transmission of the type described above in which the reverse motion can be put in without disturbing noise, while on the other hand any damages are safely excluded in case the reverse motion should be put in unintentionally while the car is moving forward.

Another object of the invention is to provide a variable speed transmission with a safety stop which automatically makes it impossible for the driver to shift into the reverse gear when the car is moving forward with substantial speed. Another object of the invention is to provide a stop of a purely mechanical type which is operated by centrifugal force. It is a further object to provide a transmission with a stop acting immediately upon a shifting clutch and, therefore, sources of errors, such as those that may arise for instance from distortions of the car body, are safely avoided.

Another object of the invention is to provide a stop actuated by centrifugal force provided by revolving parts which are connected with the driving axle of the car.

SUMMARY OF THE INVENTION

I have invented an improved variable-speed transmission for motor cars which is provided with a stop means incorporated into the shifting clutch for the reverse gear.

So the invention makes it possible on the one hand to suppress the undesirable noise in a technically simple and mature manner and, on the other hand, to eliminate the risks connected therewith. Furthermore, the advantage of this arrangement is to be seen in the fact that the stop acts directly at the point where it is to become effective, namely, at the shifting clutch for the reverse gear, and that on the other hand the shifting clutch meets the above requirements by being rigidly connected with the driven shaft of the transmission to rotate therewith. Another advantage of this embodiment lies in the fact that the arrangement may be very simple and does not require any additional space, as will be described in detail below.

Commonly used shifting clutches for synchronized transmissions which in the engaged position provide a positive connection between the respective gear and the driven shaft arranged concentrically therewith, comprise a guiding sleeve rigidly mounted on the driven shaft, an axially displaceable gearshift sleeve with internal toothing connected with the guiding sleeve to rotate therewith, and a clutch body connected to rotate with the gear to be engaged. The clutch body is provided with an outer toothing which in the engaged position meshes with the toothing of the gearshift sleeve. Thus, axial displacement of the gearshift sleeve will result in the positive connection between the gear and the driven shaft, via the clutch body, the gearshift sleeve and the guiding sleeve. According to a preferred embodiment of the invention, a shifting clutch of this type has the stop located in the guiding sleeve in a manner such that in the meshing condition it engages the gearshift sleeve. As a result of such engagement, the gearshift sleeve is prevented from performing the axial movement necessary for carrying out the shifting operation, which means that the desired blocking effect is achieved.

The stop may be designed in different ways. In a preferred embodiment of the invention, it comprises several centrifugal weight catch levers arranged to pivot about axially aligned axes. When the car is moving at low speeds, each of the centrifugal weight catch levers is retained in the disengaged position by a spring. The centrifugal weight catch levers consist preferably of two-armed levers mounted at a point outside their center of gravity to pivot about an axis extending in parallel to the driven shaft and revolving about the latter. In this case, the spring takes preferably the form of a pressure spring acting upon the lighter arm of the centrifugal weight catch lever which in its inoperative position extends substantially tangentially to the gearshift sleeve. When the car is stationary and also when the car is travelling slowly, i.e. at low speed, the differential torque of the two arms of the lever which produces the radially outward motion of the lever end, is smaller than the oppositely directed torque produced by the pressure spring so that the centrifugal weight catch lever remains in its inoperative position. When the travelling speed of the car and, thus, the speed of the shaft rises above a certain value, the differential torque of the two lever arms becomes predominant, the centrifugal weight catch lever compresses the pressure spring and pivots so that its arm having the greater mass moves radially outwardly and engages the gearshift sleeve.

The number of centrifugal weight catch levers used may be selected at desire but should be at least two in order to permit a symmetrical arrangement and, thus to prevent imbalances. Preferably, three catch levers are employed.

The centrifugal weight catch levers may be arranged at different points of the guiding sleeve. For instance, they may be provided on one end face of the guiding sleeve. This offers the advantage that they are easily accessible for assembly purposes. In preferred embodiments of the invention, however, the centrifugal weight catch levers are provided each in one recess in the guiding sleeve which ends in the sleeve surface. In the neutral position of the gearshift sleeve each of the said recesses is aligned with an oppositely arranged recess in the inner surface of the gear-shift sleeve. This latter recess in the gearshift sleeve opens to the side opposite to the direction into which the gearshift sleeve is displaced when shifting into the reverse gear. This axial opening is necessary when the same gear-shift sleeve is used—as usual—for two different gears by moving the gearshift sleeve axially from its neutral position into two opposite directions. When the gearshift sleeve is used only for the reverse gear, this opening in the axial direction is of course not necessary.

The recesses in the gearshift sleeve which in the blocked position are engaged by the centrifugal weight catch levers, may be adapted to the shape of the outwardly moving end portion of the corresponding arm of the catch lever, as it is always the same catch lever which is confronted with a specific area of the gearshift sleeve since the latter can be displaced only in the axial direction but not tangentially relative to the guiding sleeve.

Known guiding sleeves are provided with a central annular groove arranged in the internal toothing and serving to fix the gearshift sleeve in its neutral position. The gearshift sleeve is retained in its neutral position by means of a spring detent. In a preferred embodiment of the invention, the same annular groove serves as recess for receiving the centrifugal weight catch levers in their blocking position. The axial opening mentioned before is provided by removing a few teeth only from that peripheral portion in which the end of the catch lever engages in its blocking position the annular groove in the gearshift sleeve. The removal of these few teeth does not influence the load and the service life of the gearshift sleeve as the load is anyway supported by a few teeth only.

The swinging movement of the centrifugal weight catch levers is limited by the contact of the one arm with the bottom of the annular groove and/or the recess in the gearshift sleeve or by the contact of the other arm with the bottom of the recess in the guiding sleeve in which the centrifugal weight catch levers are located. However, if the limitation is to be achieved by the contact of the end of the catch lever with the bottom of the annular groove in the gearshift sleeve, it is a disadvantage that in cases where the same gearshift sleeve is to be used also for one forward gear shifting into this forward gear is impaired due to the frictional forces encountered during the axial motion of the gearshift sleeve due to the contact between the ends of the catch lever and the gearshift sleeve. As the limitation of the swinging movement of the centrifugal weight catch levers by the contact between the latter and the bottom of the recess in the guiding sleeve would require great precision in the production of this recess, a preferred embodiment of the invention has the swinging motion performed by the centrifugal weight catch levers under the action of the centrifugal force limited by stops so that their radially outward movement ends before they get into contact with the bottom of the recess in the gearshift sleeve and/or the guiding sleeve. The said stops preferably take the form of a pin fixed to the guiding sleeve and projecting axially into a recess in the centrifugal weight catch lever. The recess takes preferably the form of a bore which can be provided in the catch lever during the production process with sufficient precision and without much additional effort, as the catch lever must anyway be provided with a mounting bore. The same applies also as regards the processing of the bores intended for a bearing pin for the centrifugal weight catch lever and for the pin forming the stop.

BRIEF DESCRIPTION OF THE DRAWINGS

Further details and improvements of the present invention will be apparent from the following description of one embodiment of the invention shown in the drawing, when read in connection with the claims. In the drawing which is a simplified diagrammatic representation of the invention, in which all the details not necessary for the understanding of the invention have been omitted.

DETAILED DESCRIPTION OF THE DRAWINGS

Figure 1:
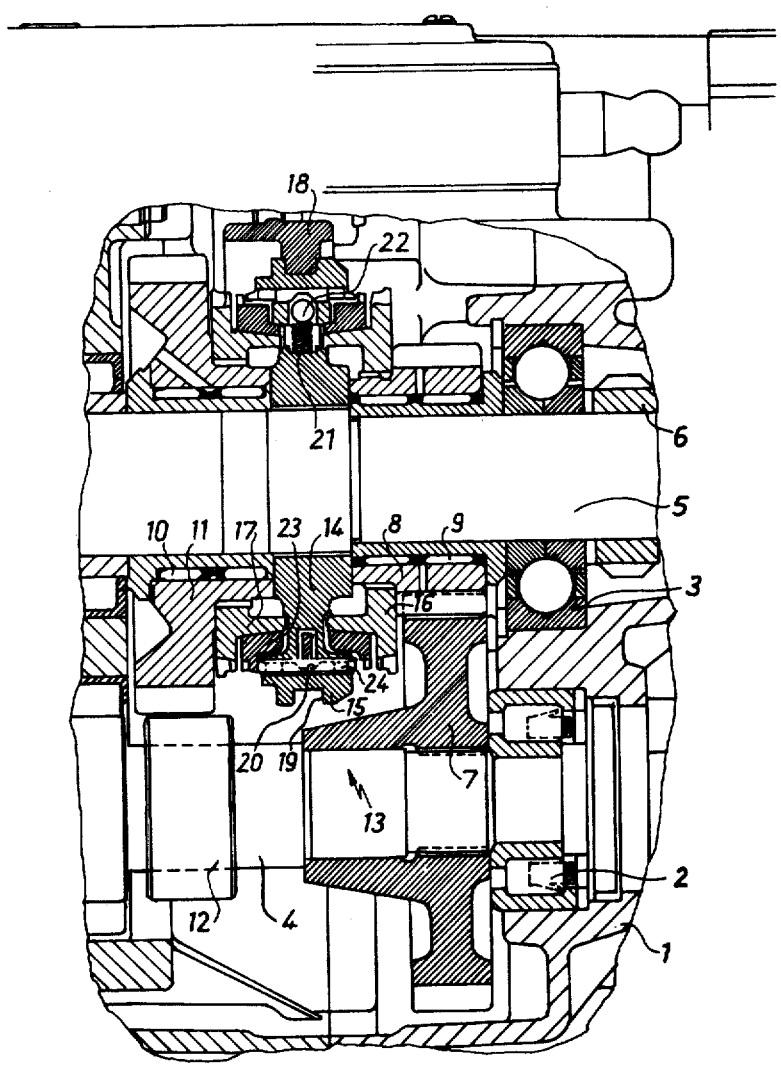
FIG. 1 shows a longitudinal section through the area of a layshaft transmission neighbouring the driven shaft with the axes of the driven shaft and the layshaft extending in the sectional plane.
Figure 2:
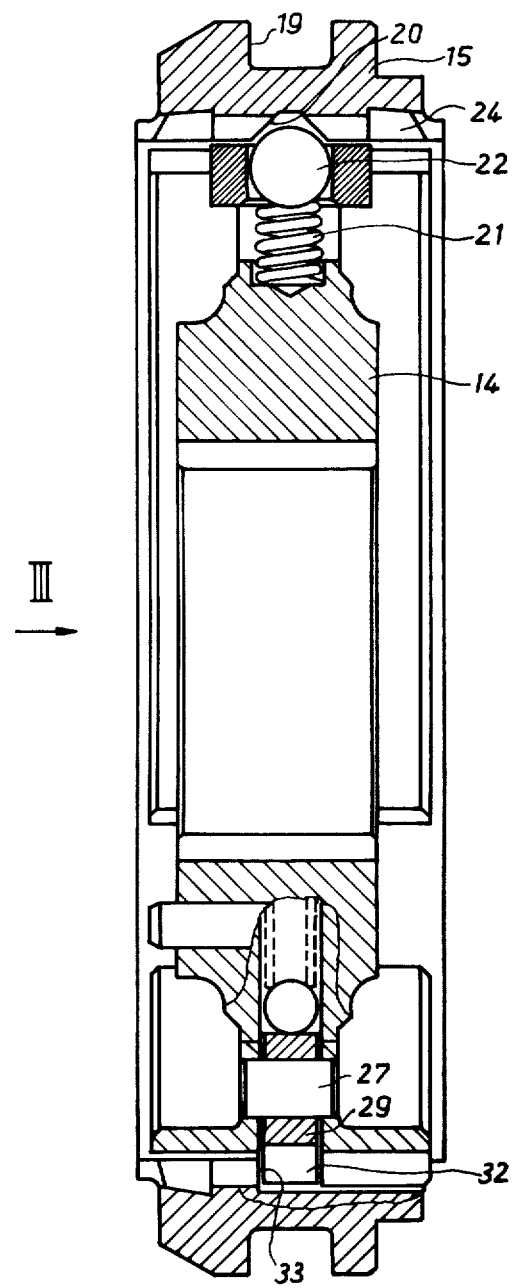
FIG. 2 shows a longitudinal section through a sleeve unit comprising a guiding sleeve and a gearshift sleeve, in an enlarged scale as compared to FIG. 1, along line II—II in FIG. 3.
Figure 3:
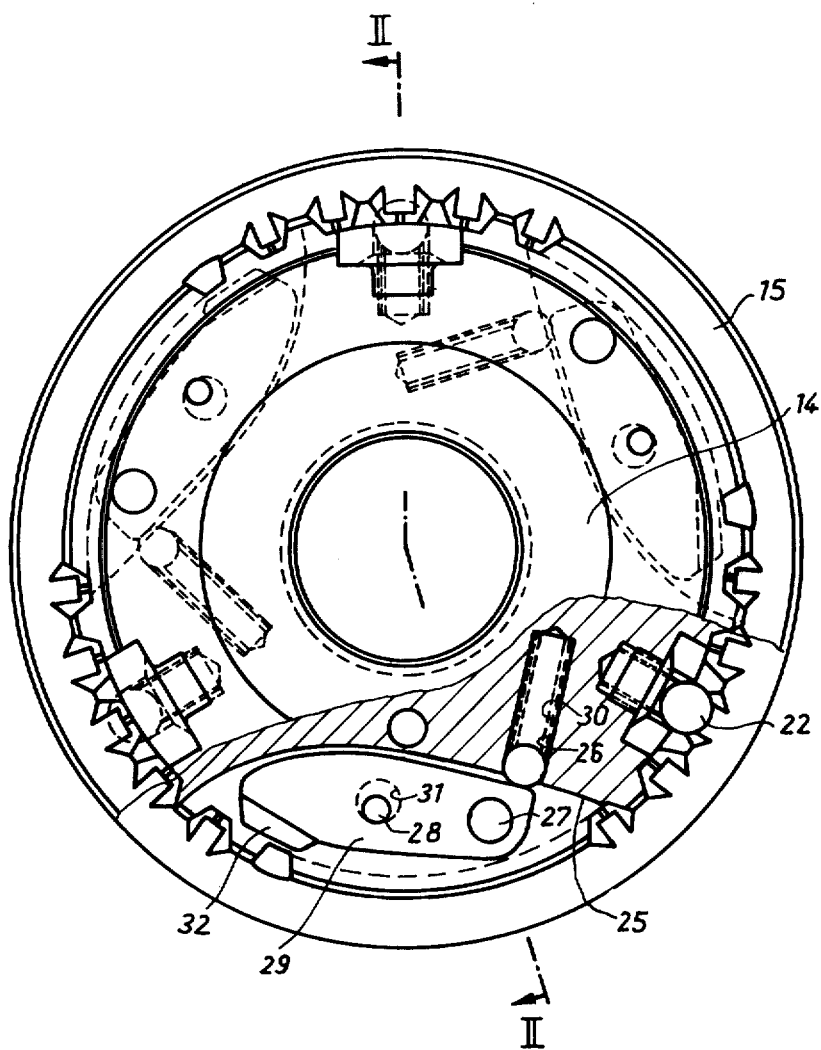
FIG. 3 shows a view of the unit taken in the direction indicated by arrow III in FIG. 2.

FIG. 1 shows the pairs of gears for the fifth gear and the reverse gear of a layshaft transmission, which can be selectively shifted into the power flux from the layshaft to the driven shaft by means of the same shifting clutch.

A layshaft 4 and a driven shaft 5 are rotatably seated in antifriction bearings 2 and 3 in a housing 1. The power take-off end of the driven shaft 5 carries a gear 6 which drives a tachometer. Two pairs of gears, one intended for the fifth gear and the other one intended for the reverse gear, are arranged in parallel and neighbouring planes. The pair of gears for the fifth gear comprises a gear 7 keyed upon the layshaft and a gear 8 mounted to rotate about the driven shaft 5 by means of a needle bearing 9. The gears of the reverse motion comprise a gear 11 seated at an axial distance from the gear 8 in a needle bearing 10 to rotate about the driven shaft 5. The gear 11 is in mesh with an intermediate gear not shown in the drawing which in turn is in mesh with a gear 12 integrally formed upon the layshaft 4. Thus, the gears 7 and 8 and/or 11 and 12 are always in mesh, either directly or indirectly.

A shifting clutch 13 serves to effect the driving connection between the gear pairs 7, 8 and 11, 12, respectively, with the driven shaft 5. The shifting clutch 13 comprises a guiding sleeve 14 which is rigidly mounted on the driven shaft 5 to rotate with the latter and which carries on its toothed circumference a gearshift sleeve 15 which is axially displaceable in relation to the guiding sleeve 14. The inner toothing of the gearshift sleeve 15 coacts with a corresponding outer toothing of clutch bodies 16 and 17, respectively, which are rigidly connected with the gear 8 and the gear 11, respectively. When the gearshift sleeve 15 is displaced in the axial direction, its toothing is selectively brought into positive engagement with the clutch body 16 or the clutch body 17, whereby the driving connection with the driven shaft 5 via the driving sleeve 14 is achieved. The gearshift sleeve 15 can be displaced into three different positions by means of a shift fork 18 which in a manner wellknown and not shown in the drawing can be brought in coacting engagement with a gearshift lever operable by the driver. To this end, the shift fork 18 engages an outer annual groove 19 in the gearshift sleeve 15. In the internal toothing of the gearshift sleeve 15, a central internal annular groove 20 is provided which serves to retain the gearshift sleeve 15 in its central neutral position. To this end, a pressure spring 21 is provided in a radial bore in the guiding sleeve 14 which presses a ball 22 into the internal annular groove 20.

For synchronization purposes, the clutch bodies 16 and 17 are in the known manner provided with conical surfaces against which a matching face of a synchronizing ring 23 can be pressed. The synchronizing ring 23 can be slightly displaced in the axial and tangential directions relative to the guiding sleeve 14. The synchronizing ring 23 and the friction surface of the associated clutch body 16 or 17 form together a preliminary friction clutch which ensures that the internal toothing 24 of the gearshift sleeve 15 and the outer toothing of the clutch body 16 or 17 cannot come into engagement until uniformity of their speeds has been reached.

According to the representation of FIG. 1, the gear 11 of the reverse motion has also associated to it a clutch body with friction cone which also coacts with a synchronizing ring 23.

The synchronization makes it possible to engage the reverse motion also when the car is moving, for instance travelling in the forward direction. If in such a travelling condition the reverse motion has been put in and the main clutch between the drive motor and the input shaft of the transmission is then engaged by the driver, this has two undesirable effects: On the one hand, the car is suddenly braked, and on the other hand the drive motor is subjected to a torque causing it to rotate in the wrong direction, as prior to being engaged the two clutch halves of the main clutch do not only rotate at different speeds, but also in different directions. In order to safely exclude this operating condition, the following modification is applied to the shifting clutch 13.

The guiding sleeve 14 is provided with three recesses 25 with curved bottom which are uniformly distributed over its periphery and extend radially inwardly from its peripheral surface. At one point of each recess 25, a bore 26 extends into the guiding sleeve 14, in substantially vertical orientation relative to the bottom of the recess. The axis of the bore 26 and the plane of the recess 25 lie in a plane extending vertically in relation to the axis of the guiding sleeve 14. Within the contour of the recess 25, there are provided two additional bores extending in parallel to the axis of the guiding sleeve 14. Pressed into these bores are pins 27 and 28, respectively. The pin 27 forms approximately the continuation of the bore 26, but is set off in relation to the latter's axis towards the cener of the surface defined by the contour of the recess 25. The pin 28 is located substantially midway between the pin 27 and the more remote area of the recess 25.

A centrifugal weight catch lever 29 in the form of a two-armed lever is seated to pivot about the pin 27, at a point outside its center of gravity. A pressure spring 30 inserted into the bore 26 retains the lever in a position in which it is fully embraced by the contour of the recess 25. It is provided with a transverse bore 31 accommodating the pin 28. The transverse bore 31 has a diameter larger than that of the pin 28 and acts to limit the swinging motion of the centrifugal weight catch lever 29 about the pin 27 so that in its end position the centrifugal weight catch lever 29 is fully embraced by the contour of the recess 25 but not in contact with the bottom of the recess. As long as the sleeve is in the stationary condition, the centrifugal weight catch lever is retained in this position by the pressure spring 30. In the opposite end position, which it occupies against the action of the pressure spring 30 when the guiding sleeve 14 revolves at a sufficiently high speed, a projecting tooth 32 provided at the end of the centrifugal weight catch lever 29 extends into the inner annular groove 20 of the gearshift sleeve 15. In this area, the inner annular groove 20 is provided with a flank 33 extending vertically to the axis of rotation. This flank 33 is arranged on the side of the inner annular groove 20 opposite the gear 11 for the reverse motion, while on the side facing the gear 11, the flank of the inner annular groove 20 has been fully removed so as not to impair the displacement of the gearshift sleeve 15 towards the gear 8 of the fifth speed. To this end it will be generally sufficient to remove one tooth of the internal toothing 24 on one side of the inner annular groove 20 adjacent the tooth 32 of the centrifugal weight catch lever 29.

As long as the car is stationary or moves at low speed, the centrifugal weight catch levers 29 are ineffective; they lie within the contour of the recess 25, and both the reverse motion and the fifth gear can be easily put in. Due to the synchronization of the reverse motion, no disturbing noise will be heard when the reverse motion is thrown in as the preliminary friction clutch makes sure that the shifting sleeve 15 and the clutch body 17 rotate at the same speeds before their toothings come to mesh. However, when a predetermined minimum rotational speed and/or a proportional minimum travelling speed of the car is exceeded, the teeth 32 of the centrifugal weight catch levers 29 enter the inner annular groove 20 of the gearshift sleeve 15 and prevent the latter from being moved into the direction in which the reverse motion is engaged. To this end, the flank of the tooth 32 comes to bear against the flank 33. The two flanks extend vertically to the axial direction of displacement. The fifth gear, however, can be put in without any difficulty regardless of the travelling speed of the car due to the fact that the internal toothing of the respective tooth 32 can be removed on the side opposite the flank 33 so that the groove is axially open in this area. Due to the fact that the tooth 32 does not get into contact with the bottom of the inner annular groove 20 as a result of the limitation of the swinging angle defined by the bore 31 and the pin 28, the fifth speed can be shifted normally, i.e. without any additional friction.

It goes without saying that the means for blocking the engagement of the reverse motion may be designed also in different ways, provided the blocking means operate in response to the travelling speed of the car and/or the proportional rotational speed of the driven shaft 5 or of any other part moved continuously in proportion thereto. The embodiment shown offers the advantage of great reliability, combined with extreme simplicity. In principle, it does not matter in this connection whether the transmission takes the form of a layshaft transmission or any other form, as long as its design makes it possible to engage the reverse motion erroneously while the car is moving in the forward direction.

I claim to have invented:

1. A multi-step reduction gear for motor vehicles, comprising a transmission of the countershaft type of construction, having several forward gear sets and one reverse gear set in which at least the reverse gear set is synchronized and constantly engaged with each other, at least one gear set of the forward speeds and reverse speed is engaged for the transmission of power by a clutch having an axially sliding member, said clutch serving to actuate the reverse gear being blocked against engagement therewith by a stop actuated by centrifugal force when a given speed is exceeded, said stop being built into the clutch and engaging the axially movable member positively when engaged to prevent movement thereof into engagement with the gear set for reverse motion.

2. A variable speed transmission for motor cars, comprising a manually operable transmission having a drive shaft, a driven shaft and at least one forward speed and a reverse motion being effected respectively by synchronized gear sets constantly driven by the drive shaft and a shifting clutch for selective shifting of said sets into engagement with the driven shaft, said shifting clutch comprising a guiding sleeve fixed to the driven shaft, gearshift sleeve connected to rotate with the guiding sleeve, said gearshift sleeve being axially displaceable from a central neutral position to a selected one of opposed axial directions in association with at least one of said gear sets for forward speed and said gear set for reverse motion, a clutch body mounted between said gearshift sleeve and each of said associated gear sets to rotate with the associated gear set, the toothing of the said gearshift sleeve being adapted to mesh with the toothing of the associated clutch body on axial movement of said gearshift sleeve and stop means located within the guiding sleeve movable to engage the gearshift sleeve when the speed of said driven shaft exceeds a predetermined speed for blocking the axial movement of the gearshift sleeve toward the clutch body associated with the reverse motion gear set and thereby prevent actuation of reverse motion.

3. A variable-speed transmission for motor cars in accordance with claim 2 wherein the stop comprises a number of centrifugal weight catch levers mounted to pivot about axially aligned axes, said centrifugal weight catch levers being retained by a pressure spring in the disengaged position when the car is travelling at low speed.

4. A variable-speed transmission for motor cars in accordance with claim 3, wherein each of the centrifugal weight catch levers is located in a recess in the guiding sleeve, each of the said recesses end in the peripheral surface of said guiding sleeve and is associated with an oppositely arranged recess in the inner surface of the gearshift sleeve when the latter is in the neutral central position, said oppositely arranged recess being open at the end opposite the direction in which the gearshift sleeve is displaced in association with the reverse gear.

5. A variable-speed transmission for motor cars in accordance with claim 4, comprising a central annular groove formed into the internal toothing of the gearshift sleeve, said groove serving to fix the latter in its neutral position, and serving as recess for accommodating a blocking tooth of the centrifugal weight catch lever in its blocking position.

6. A variable-speed transmission for motor cars in accordance with claim 4 wherein the swinging motion of the centrifugal weight catch levers under the effect of the centrifugal force is limited by stops so that their radially outward movement ends before they come into contact with the bottom of the recess in the gearshift sleeve.

7. A variable-speed transmission for motor cars in accordance with claim 6, wherein the stop takes the form of a pin projecting axially into a recess in the centrifugal weight catch lever.

* * * * *